US006235373B1

(12) United States Patent
Graff

(10) Patent No.: US 6,235,373 B1
(45) Date of Patent: May 22, 2001

(54) HOUSEHOLD ABSORBENT PAPER

(75) Inventor: Pierre Graff, Wolfgantzen (FR)

(73) Assignee: Fort James France, Kunheim (FR)

(*) Notice: Subject to any disclaimer, the term of this patent is extended or adjusted under 35 U.S.C. 154(b) by 0 days.

(21) Appl. No.: 09/244,014

(22) Filed: Feb. 4, 1999

(30) Foreign Application Priority Data

Feb. 6, 2001 (FR) .... 98 01431

(51) Int. Cl.[7] .... B32B 3/00; D21H 11/00

(52) U.S. Cl. .... 428/172; 428/154; 428/187; 162/109

(58) Field of Search .... 428/156, 172, 428/155, 154, 187, 198, 219; 162/107, 109

(56) References Cited

U.S. PATENT DOCUMENTS 3,414,459 * 12/1968 Wells .... 428/155
4,978,565 * 12/1990 Pigneul et al. .... 428/156
5,173,351 * 12/1992 Ruppel et al. .... 428/154

* cited by examiner

*Primary Examiner*—Donald J. Loney
(74) *Attorney, Agent, or Firm*—Breiner & Breiner

(57) ABSTRACT

Compound webs with improved absorption and pliancy are described. The compound web includes: (a) protrusions in each ply at a frequency greater than 10 protrusions/cm$^2$ and with the surface of the peaks of the protrusions of each ply being greater than 5% of the surface of the ply, and (b) at least one of the plies being embossed in the form of an artistic pattern wherein the distances and the directions of an arbitrary protrusion relative to adjacent protrusions are varied. The pattern is selected in such a manner that at least 25% of the protrusions of the ply take part in effective bonding with the coinciding protrusions of the other ply and the total bonded surface of the protrusion peaks of the ply that take part in bonding is at least 15% of the total surface of the peaks of the protrusion of the ply regardless of the relative positions of the patterns of the two plies.

20 Claims, 6 Drawing Sheets

ABS. vs CD WET

HOUSEHOLD ABSORBENT PAPER

FIELD OF THE INVENTION

The invention concerns household absorbent papers made of cellulose wadding.

BACKGROUND OF THE INVENTION

More specifically, the invention relates to a compound web of two plies of absorbent paper made of conventional creped cellulose wadding and having a specific surface weight of 10 to 40 g/c$^2$. The plies are embossed by calendering into fine patterns of protrusions and are bonded to each other, especially by glueing, at the surfaces of the peaks of the coinciding protrusions of the two plies.

U.S. Pat. No. 3,414,459 describes a method for embossing and bonding to each other two cellulose wadding plies using the so-called tip-to-tip technique. In this technique, the two plies are embossed separately using identical metal cylinders fitted with embossing protrusions and, respectively, cooperating with rubber-clad rollers. Next, a suitable glue is deposited on the protusion peaks of one of the plies. Lastly, the two plies are bonded to each other at the peaks of the protrusions by being clamped between the two embossing cylinders which are rotatably ganged to each other in such a manner that the embossing protrusions meet tip-to-tip. This technique entails that the two cylinders include symmetrical patterns and that the embossing protrusions of the two cylinders perfectly coincide inside the clamping gap. Radial or circumferential slippage between the embossing protrusions of the two cylinders can lead to a lack of adhesion in some zones of the compound web so made.

To remedy these drawbacks, U.S. Pat. No. 5,173,351 proposes using patterns of different repeats, in at least one direction, on the two embossing cylinders to ensure that there is at least one bonding site on the elementary compound webs produced by cutting the compound web issuing from the equipment.

Lastly, WO 96/32248 patent application suggests bonding only some zones of the two embossed plies by applying glue only to the ends of the protrusions of one of the plies taking part in the actual bonding. In this design as well, the two cylinders must have symmetrical patterns and the embossing protrusions of the two cylinders must accurately coincide in the clamping gap.

In the designs of these three documents, the embossing protrusions are mounted on the cylinders along generatrices of regularly spaced helices and great circles. Consequently, the protrusions formed in the plies by the embossing protrusion imprints are aligned in preferential directions and at constant distances. The observer viewing the outsides of the compound web is then under the impression that these surfaces are fitted with geometric designs solely constituted of straight lines or straight line segments.

It is clear that a slight axial or circumferential shift between the two cylinders caused by a lack of synchronization or by wear of the drive means can lead to a lack of coincidence between the embossing protrusions within the clamping gap of the embossing cylinders and thus shall entail rejects.

Other techniques for assembling the plies allow nesting of the protrusions of one of the plies between the protrusions of the other ply so as to achieve a so-called nested structure which offers improved absorption. Using such a technique, the embossing cylinders are moved apart and the embossed ply is removed from one of the cylinders to nest the ply in the other ply by passing in a clamping gap between the other embossing cylinder and a smooth complementary cylinder. This technique also requires perfect synchronization of the two embossing cylinders.

OBJECTS AND BRIEF DESCRIPTION OF THE INVENTION

The object of the invention is to improve both absorption and pliancy of the above defined compound webs in such a manner that the final product retains the appearance of the products made by current techniques, and whereby it becomes possible to lift the constraints which were set on the choice of patterns and on accurately ganging the embossing cylinders.

The goal of the invention is obtained in that:

(a) the frequency of the protrusions of each ply is greater than 10 protrusions/cm$^2$ and the surface of the peaks of the protrusions of each ply is greater than 5% of the surface of the ply, and (b) at least one of the plies is embossed in the form of an artistic pattern wherein the distances and the directions of an arbitrary protrusion relative to adjacent protrusions are varied, the pattern being selected in such a manner that at least 25% of the protrusions of the ply take part in effective bonding with the coinciding protrusions of the other ply and in that the total bonded surface of the protrusion peaks of the ply that take part in bonding is at least 15% of the total surface of the peaks of the protrusion of the ply regardless of the relative positions of the patterns of the two plies.

Advantageously 30%, and even more advantageously 40%, of the protrusions of one ply take part in effectively bonding with the coincident protrusions of the other ply. It has been found there is improvement up to 70%.

Preferably, the total bonded surfaces of the protrusion peaks of a ply are at least 20% of the protrusion surfaces of the ply.

Advantageously the surface of the protrusion peaks of each ply are less than 30% of the total ply surface. This surface preferably is larger than 7.5% of the total surface of the ply and, preferably, less than 15% of the ply surface. The protrusion density of each ply is less than 30 protrusions/cm$^2$ and, preferably, less than 20 protrusions/cm$^2$.

Advantageously the two plies are embossed with artistic patterns which can be identical or not.

The two patterns can be mutually offset by translating or rotating the pattern imprint of an embossing cylinder relative to the pattern imprint of the other cylinder.

Other features and advantages of the invention are elucidated in the illustrative description below and in relation to the attached drawings.

DETAILED DESCRIPTION OF PRESENTLY PREFERRED EMBODIMENTS

Figure 1A:
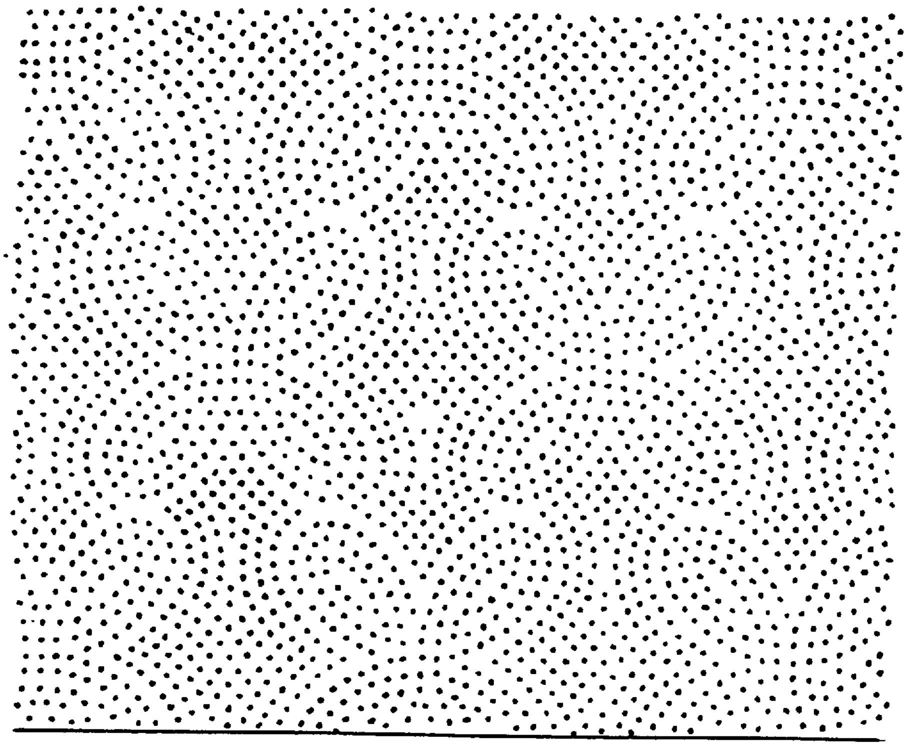
FIGS. 1a–1d show four artistic patterns formed by embossing cylinder tips to implement protrusions on the constituent plies of a compound web.
Figure 2A:
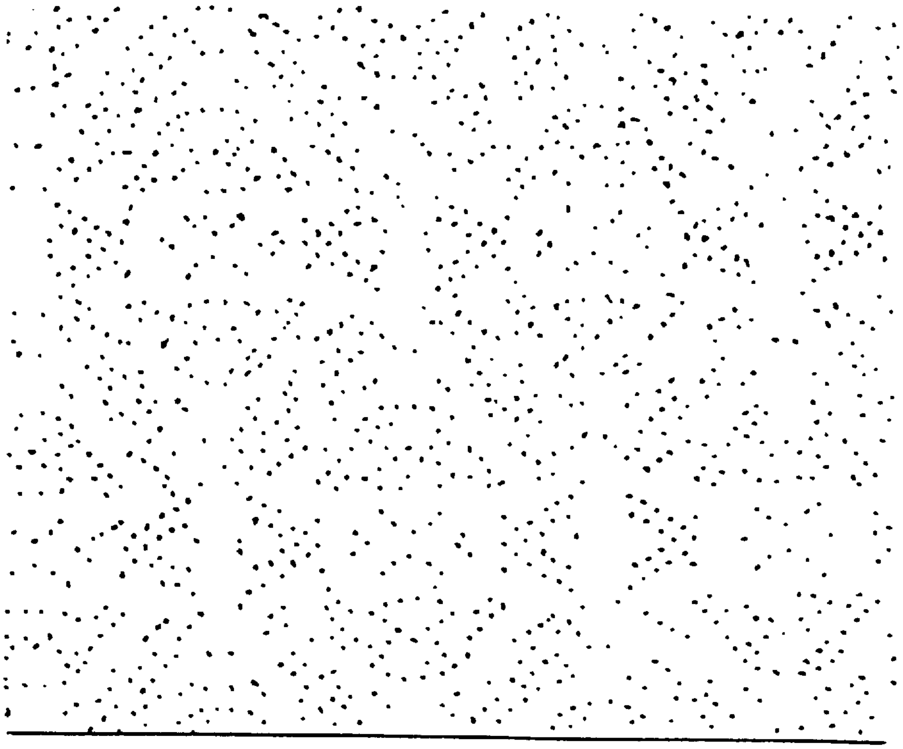
FIGS. 2a to 2e show the traces of the bonds between the protrusion peak surfaces of the two plies respectively formed by the embossing protrusion patterns shown in FIGS. 1a–1d and by a combination of the patterns of FIGS. 1b and 1c.

FIGS. 1a –1d show illustrative embossing patterns on the embossing cylinders of apparatus producing a compound web of two absorbent, cellulose wadding, conventional creped (type CWP) paper having a specific surface weight of 10 to 40 g/m$^2$. Such a web is used in households or as paper towels.

The dots shown in FIGS. 1*a* to 1*d* represent the ends of the embossing protrusions pre sent on the embossing cylinders which form ply protrusions by mechanically deforming the ply which moves through an embossing gap present between the embossing cylinder and an associated rubber cylinder of which the axis runs parallel to the embossing cylinder.

As shown in FIGS. 1*a* to 1*d*, contrary to the case of conventional geometric patterns, the patterns of the invention offer an artistic appearance, that is, within a given pattern, the distances between a given embossing protrusion and the adjacent embossing protrusions vary and the directions between an arbitrary embossing protrusion and the adjacent embossing protrusions vary also. To an observer, the embossing protrusions of a pattern appear arrayed along curved lines or in concentric circles.

The protrusions formed in the embossed plies also are arrayed on one ply surface in the same patterns.

The two plies used to form one compound web can be embossed with identical or with different patterns.

When the two patterns are identical, they are joined to each other by the so-called known point-to-point technique, however, the two patterns are mutually shifted in one direction. In this manner, only a few protrusions of one ply coincide with protrusions of the other ply and are bonded to them. The non-coincident protrusions are located between coincident protrusions somewhat in the manner of a "nested" structure. These protrusions are not bonded to the other ply and do subtend pockets. The presence of these protrusions, that are kept unbonded on account of the pockets being closed by this configuration, allows improvement in the absorption of the final product relative to the same product wherein the two plies have the same patterns and are joined in the tip-to-tip manner without offset, that is in such a way that all the protrusions of one ply coincide with and are bonded to the protrusions of the other ply.

Furthermore, the product so made is more pliant and more agreeable to the touch because of the reduction in the number of bonding sites. As a tradeoff, product rigidity and its resistance to dry or wet tearing are slightly lowered. However, this loss in strength is less than the gain in absorption. The main purpose of a paper towel being to absorb liquids, it is easy to design a product offering optimal absorption-strength features.

Because the protrusions are artistic patterns, several coincide when the patterns of the two plies are offset, whereas, as regards the present day point-to-point type structures wherein the patterns are constituted of geometries of straight line segments running in favored directions, a minute offset between the two plies' patterns cause a lack of bonding in some zones of the compound web.

Certain conditions must be met in order that there is sufficient coincidences to assure bonding of the two plies.

The embossing protrusion density must exceed 10/cm$^2$ and be less than 30/cm$^2$ and, preferably, is between 15 and 20/cm$^2$.

The surface of the embossing protrusion peaks, and hence the surface of the protrusion peaks, is greater than 5% and preferably less than 30% of the total surface.

The patterns are selected in such a manner that 25% of the protrusions of each ply, and preferably 30% and even up to 70%, take part in effectively bonding the two plies.

The total of the surfaces bonded at the protrusions taking part in the effective bonding are at least 15%, and advantageously 20%, of the total surface of the peaks of each ply.

Measurements made it possible to count the bonding sites for different patterns. Such measurements were implemented by image analysis. The grayness produced by the imprint on carbon paper caused by the bonding sites is determined by a camera in relation to a reference value (no bonding sites), whereupon a coefficient is used as a function of the mean surface of a single site.

In a first stage, the imprint is scanned at 300 graphic-dots/inch to obtain a numerical value.

In a second stage, the dark-gray threshold of the contact sites between protrusions is determined, the image zones at this threshold—or darker ones—being reproduced in black and the remainder in white.

Thereupon, the image can be converted into a binary (black and white) image which provides a greater contrast than the initial gray one. This operation is carried out using graphics software, such as "Photoscop" (ADOBE) or "Picture Publisher" (MICOGRAFX). At this stage, the percentage of the black surface representing the bonding sites can be measured using the same software.

If more information is desired in this image, an image analyzer such as "Quantiniet 600" (LECA) can be used on it in a third stage to compute, in addition to the percentage of bonded surface, the number of graphic-dots/cm$^2$, and also the surface of these graphic dots and their distribution, in the form of a bar graph.

FIGS. 2*a* –2*d* show the distribution of the bonding sites of compound webs made of embossed plies having identical and offset patterns, respectively, corresponding to the patterns of FIGS. 1*a* through 1*d*.

Figure 1B:
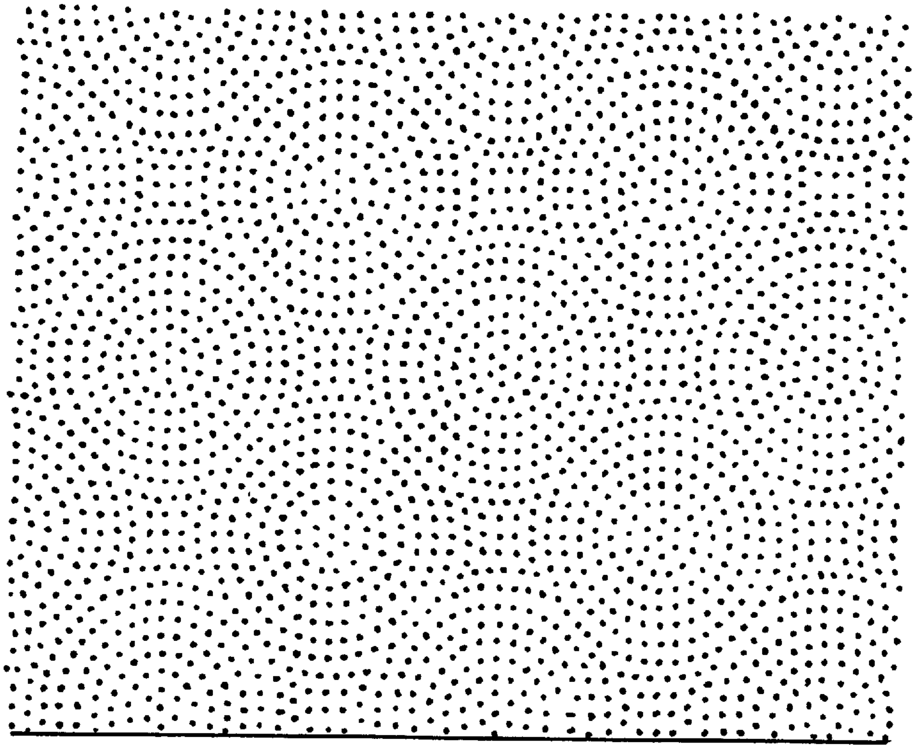
Figure 2B:
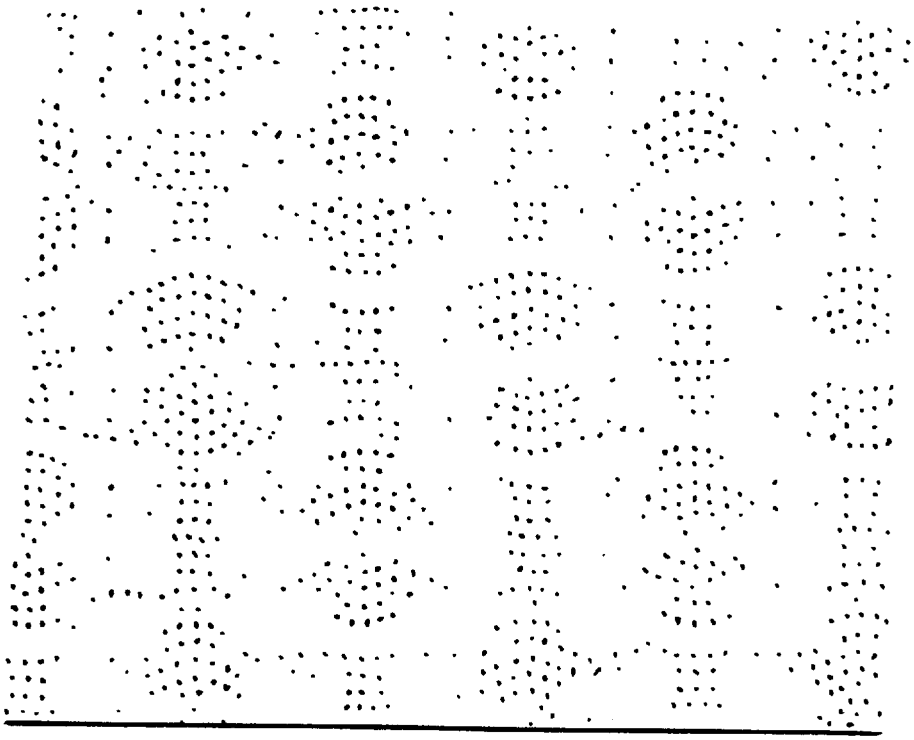
Figure 1C:
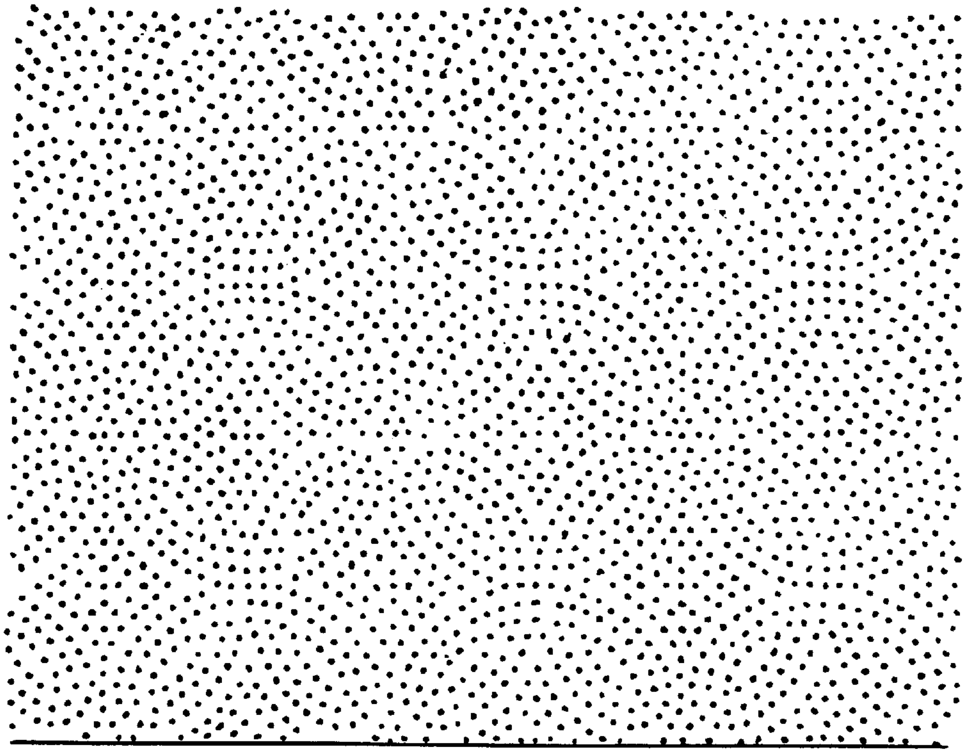
Figure 2C:
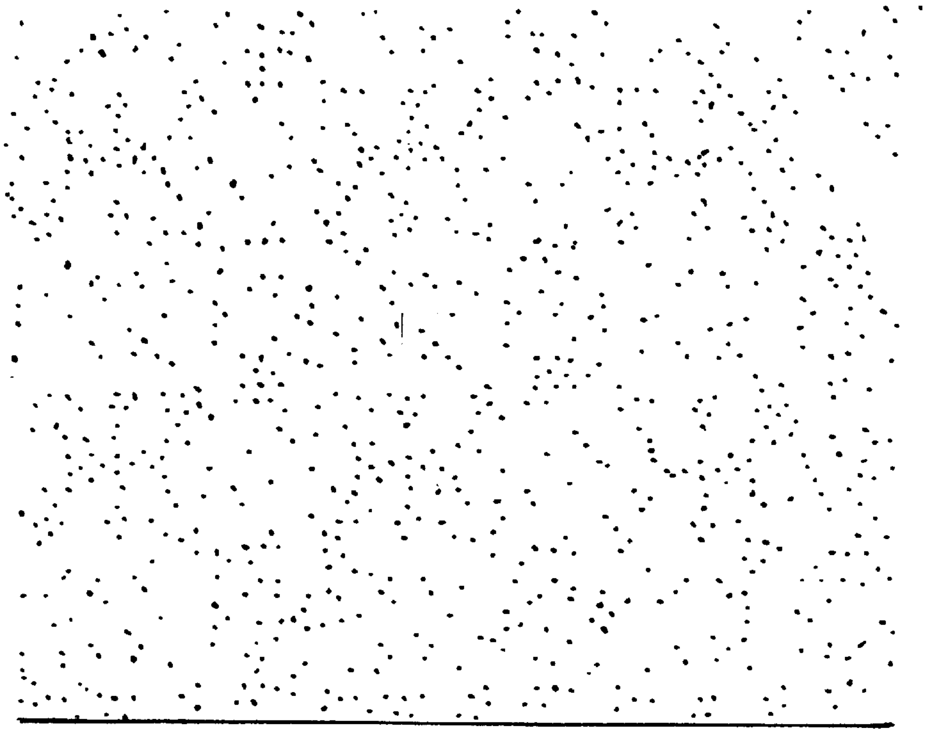
Figure 1D:
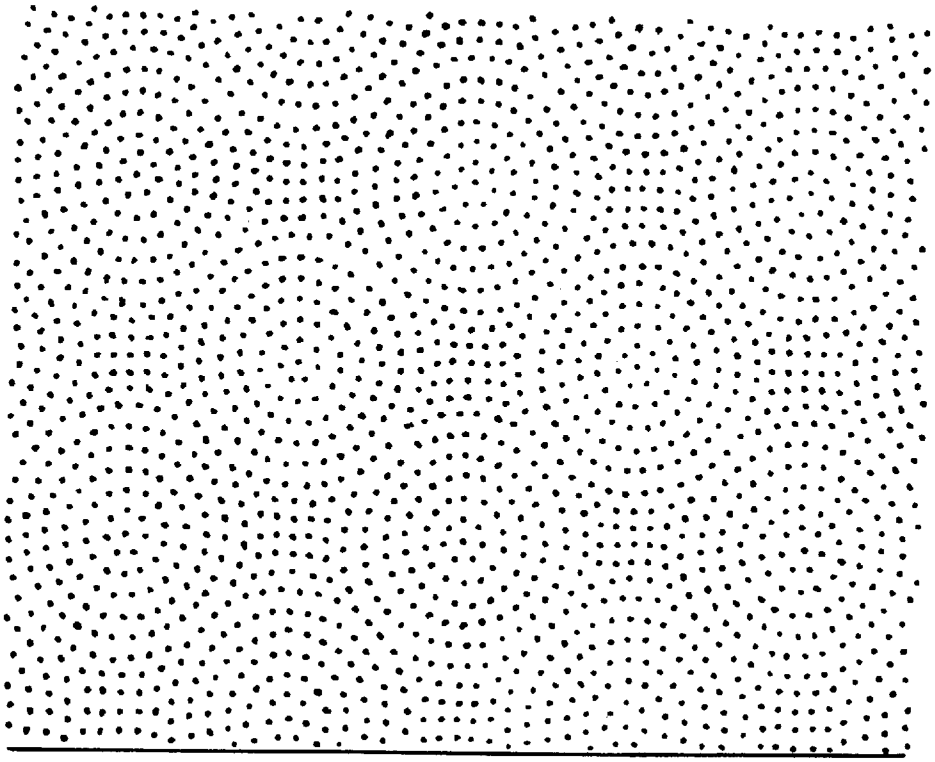
Figure 2D:
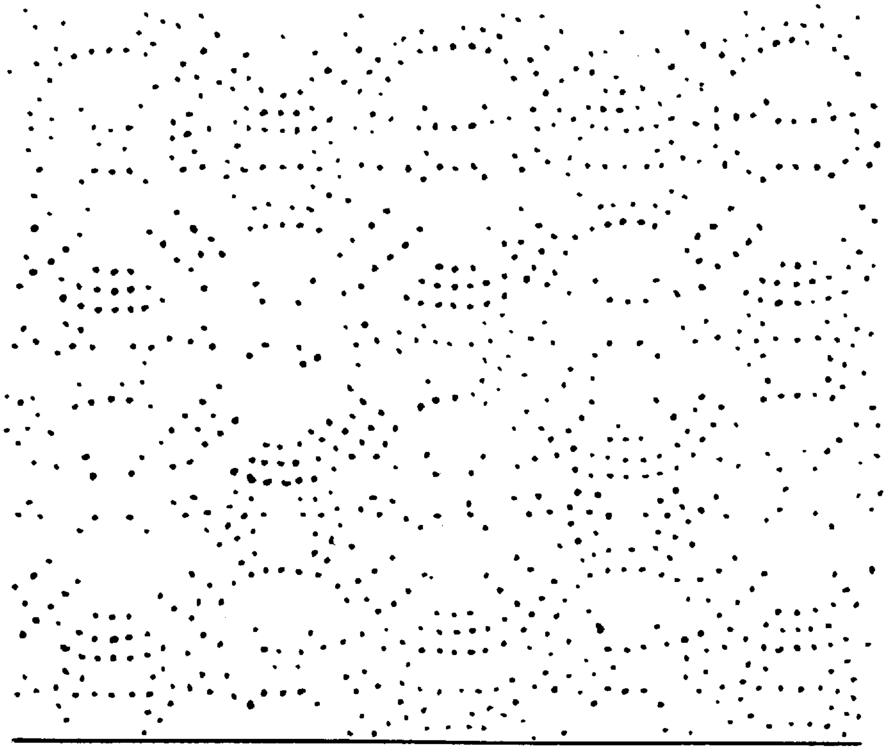
Figure 2E:
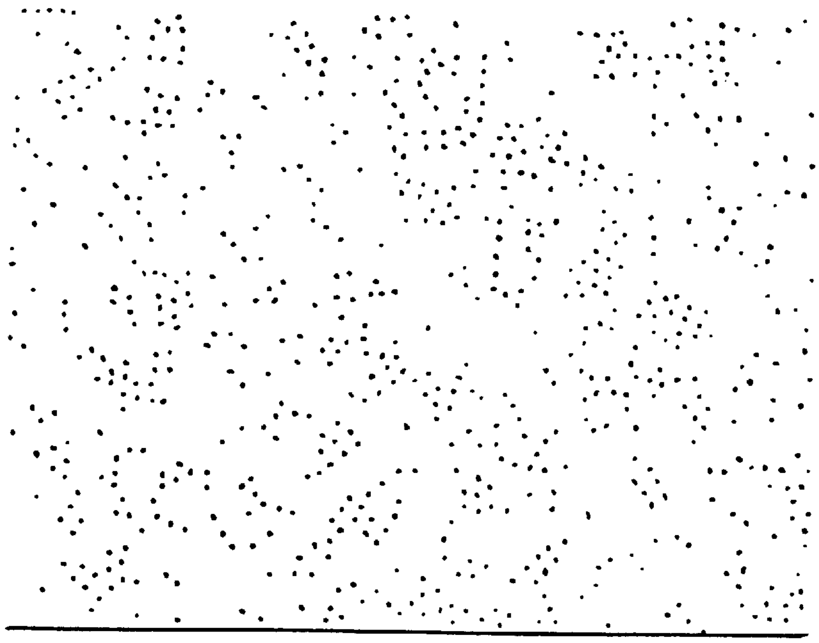

FIG. 2*e* shows the distribution of the bonding sites of a compound web of which one ply has the pattern shown in FIG. 1*b* and the other ply has the pattern shown in FIG. 1*c*.

The Table below shows the relative values of five samples denoted A through E. The references A through C correspond to compound webs having identical patterns corresponding respectively to FIGS. 1*a*–1*c*. The reference D corresponds to a sample of which one ply comprises the pattern of FIG. 1*b* and the other ply the pattern of FIG. 1*c*.

Column C2 shows the number of protrusions per cm$^2$.

Column C2 shows the number of effective bondings per cm$^2$.

Column C3 is the % ratio of the values of columns C1 to C2.

Column C4 denotes the percentage of the surface of the peaks of the protrusions in relation to the total surface, which corresponds to the actual point-to-point associated surface.

Column C5 shows the percentage of the bonded peak surfaces relative to the total surface.

Column C6 shows the % ratio of the values of columns C4 to C5.

| | C1 | C2 | C3 % | C4 % | C5 % | C6 % |
|---|---|---|---|---|---|---|
| A | 15.7 | 10.5 | 66 | 12.3 | 4.5 | 37 |
| B | 15.2 | 7.7 | 50 | 9.6 | 2.2 | 23 |
| C | 15.4 | 7 | 45 | 9.8 | 2 | 20 |

-continued

| | C1 | C2 | C3 % | C4 % | C5 % | C6 % |
|---|---|---|---|---|---|---|
| D | 12 | 7.2 | 60 | 7.6 | 2.7 | 35 |
| E = (B + C) | 15.3 | 6.8 | 44 | 9.7 | 1.9 | 20 |

Using another A sample, though with a different offset, a bonding surface was produced which was 3.3% of the total web surface, that is having 7.8 effective bondings per $cm^2$.

The measurements of the surfaces of the bonding sites, that is of the bonded contact surfaces between the coinciding protrusions, were as follows:

Mean bonding site surface: 0.42 $mm^2$

Maximum contact surface: 1.18 $mm^2$

Minimum contact surface: 0.12 $mm^2$

It was observed that the maximum contact surface, namely 1.18 $mm^2$, exceeds the peak embossing protrusion surface, namely 0.8 $mm^2$, because there is unquestionably some crushing when the glue is deposited on the protrusion peaks of a ply or when the first ply is placed against the second ply in the gap between the two embossing cylinders or even when the roll of compound web is created at the exit of the apparatus making the web.

The apparatus with which to manufacture the compound web of the invention is known per se and includes the means to bond two plies in a point-to-point manner.

The pattern offset of two plies can be implemented in a preferred direction, in general it will be the direction of web advance, by angularly offsetting one of the embossing cylinders from the other. The offset also can be achieved by pivoting one pattern relative to the other, for example, when manufacturing the two embossing cylinders.

TESTS

Using the same creped, 100% resin kraft paper, product samples were made employing the patterns shown in FIGS. 1*a*–1*d* for different embossing pressures. By increasing the embossing pressure using the same pattern, the absorption capacity is improved at the cost of lesser tear strength. In order to compare the properties of the samples, it is necessary therefore to take into account the incurred loss in strength, in particular of the wet transverse strength which is a significant paper towel parameter.

In order to show the improvement offered by the design of the invention, samples A through E and samples A', B', C', D' were made. The latter correspond to the same patterns as in FIGS. 1*a*–1*d* but are joined in perfect point-to-point position.

Figure 3:
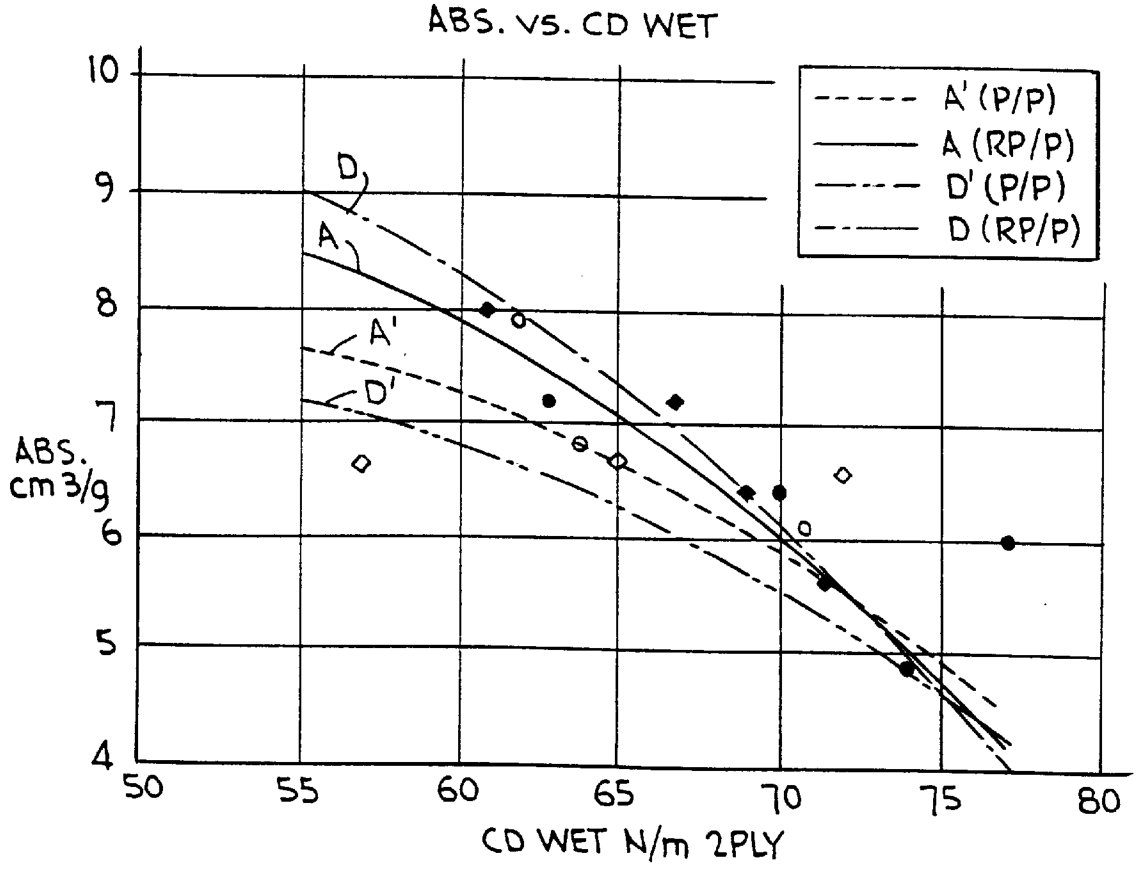
FIGS. 3 and 4 are plots showing changes in absorption (cm$^3$/g of paper) as a function of transverse wet strength (N/m) of the product for different patterns.
Figure 4:
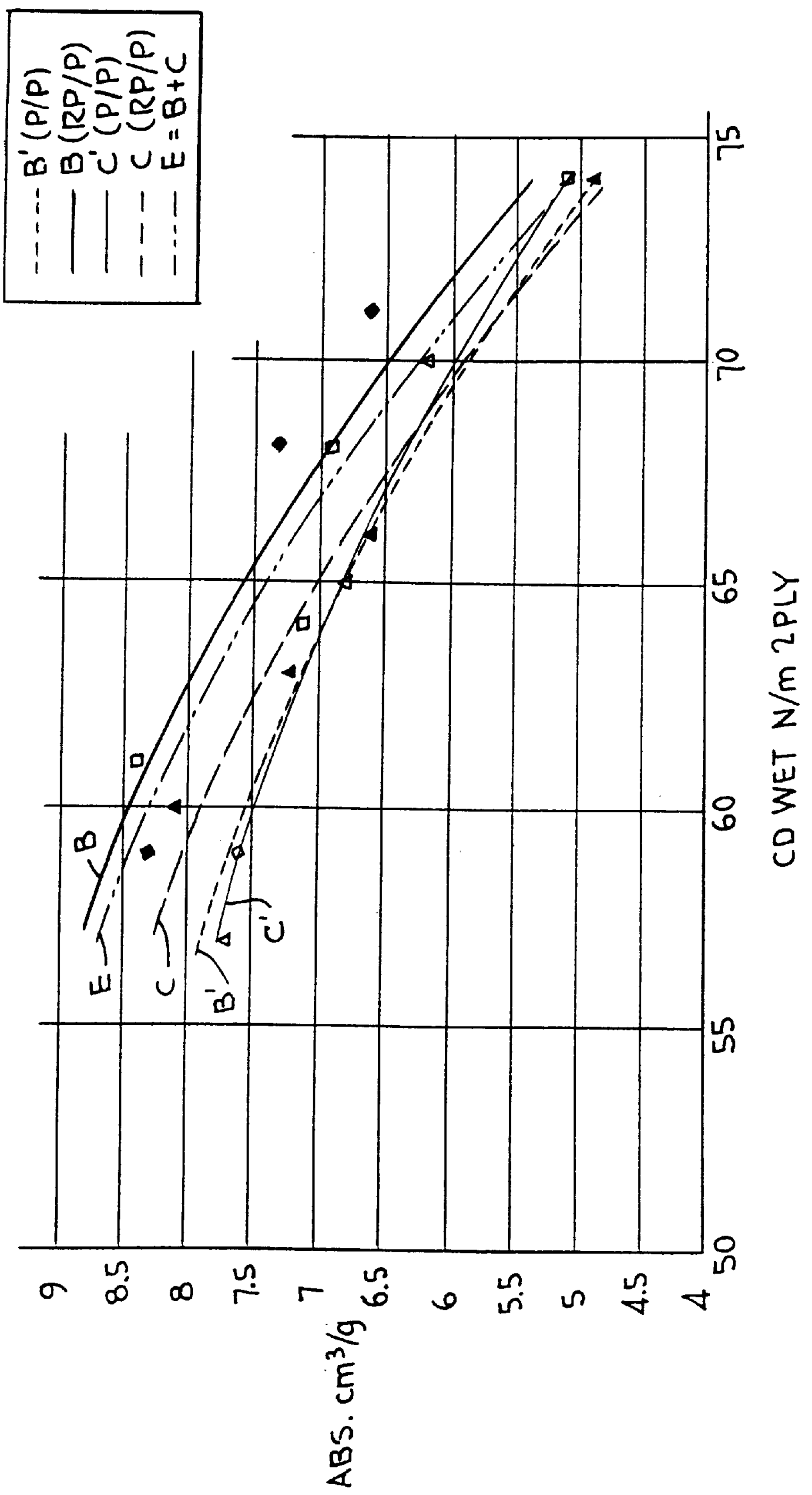

Absorption was measured by the AFNOR NF Q03-068 method. This method consists in immersing a sample in water and then, following a specified conditions draining time, determining the amount of absorbed water. Test results are plotted in FIGS. 3 and 4 with the ordinate being the absorption measured in $cm^3$ per gram of sample and the abscissa showing the transverse wet strengths at various embossing pressures. These values are listed in N/m.

The plots show that products A through E perform better than products A', D' at constant transverse wet strength.

As a control, embossed samples were made from the same CWP tissue paper in a pattern of which the basic unit comprises three mutually nesting rhombi and of which the protrusion density is 6 protrusions/$Cm^2$. The first set of samples Lp is tip-to-tip. The second series of samples Ld has a pattern offset with a bonding density of 20%. Be it noted that the offset entails no improvement in absorption.

As will be apparent to one skilled in the art, various modifications can be made within the scope of the aforesaid description. Such modifications being within the ability of one skilled in the art form a part of the present invention and are embraced by the appended claims.

It is claimed:

1. A compound web comprising at least two plies of absorbent paper and having a specific surface weight of 10 to 40 $g/m^2$, said at least two plies being embossed by calendering into patterns, said patterns comprising protrusions which are mutually bonded between plies at peak surfaces of coinciding protrusions, wherein (a) density of protrusions in each ply of said at least two plies is between 10 and 30 protrusions/$cm^2$ and the surfaces of the peak protrusions of each ply exceed 5% of total surface of said each ply, and (b) at least one of the at least two plies is embossed with an artistic pattern wherein distances and directions of any protrusions to adjacent protrusions are varied, said artistic pattern being selected so that from 25% to 70% of the protrusions of said at least one ply effectively bond with coinciding protrusions of another ply and so that total surface of protrusion peaks being effectively bonded of said at least one ply is at least 15% of total surface of protrusion peaks of said at least one ply regardless of relative positions of each artistic pattern of the at least two plies.

2. Compound web as claimed in claim 1 wherein at least 30% of the protrusions of the at least one ply effectively bond with coinciding protrusions of another ply.

3. Compound web as claimed in claim 2 wherein at least 40% of the protrusions of the at least one ply effectively bond with coinciding protrusions of another ply.

4. Compound web as claimed in any one of claims 1, 2 or 3 wherein total bonded surface of protrusion peaks of the at least one ply is at least 20% of protrusion peak surfaces of said at least one ply.

5. Compound web as claimed in any one of claims 1, 2 or 3 wherein the surfaces of the peak protrusions of said each ply is less than 30% of the total surface of said each ply.

6. Compound web as claimed in claim 4 wherein the surfaces of the peak protrusions of said each ply is less than 30% of the total surface of said each ply.

7. Compound web as claimed in any one of claims 1, 2 or 3 wherein the surfaces of the peak protrusions of said each ply exceed 7.5% of the total surface of said each ply.

8. Compound web as claimed in claim 5 wherein the surfaces of the peak protrusions of said each ply exceed 7.5% of the total surface of said each ply.

9. Compound web as claimed in claim 6 wherein the surfaces of the peak protrusions of said each ply exceed 7.5% of the total surface of said each ply.

10. Compound web as claimed in claim 7 wherein the surfaces of the peak protrusions of said each ply is less than 15% of the total surface of said each ply.

11. Compound web as claimed in claim 8 wherein the surfaces of the peak protrusions of said each ply is less than 15% of the total surface of said each ply.

12. Compound web as claimed in claim 9 wherein the surfaces of the peak protrusions of said each ply is less than 15% of the total surface of said each ply.

13. Compound web as claimed in any one of claims 1, 2 or 3 wherein the density of protrusions of said each ply is less than 20 protrusions/$cm^2$.

14. Compound web as claimed in claim 4 wherein the density of protrusions of said each ply is less than 20 protriisions/$cm^2$.

15. Compound web as claimed in claim 5 wherein the density of protrusions of said each ply is less than 20 protrusions/$cm^2$.

16. Compound web as claimed in claim 7 wherein the density of protrusions of said each ply is less than 20 protrusions/$cm^2$.

17. Compound web as claimed in claim 10 wherein the density of protrusions of said each ply is less than 20 protrusions/$cm^2$.

18. Compound web as claimed in claim 1 wherein at least two plies are embossed in artistic patterns.

19. Compound web as claimed in claim 18 wherein the artistic patterns of the at least two plies are identical and mutually offset.

20. Compound web as claimed in claim 18 wherein the artistic patterns of the at least two plies are different.

* * * * *